UNITED STATES PATENT OFFICE.

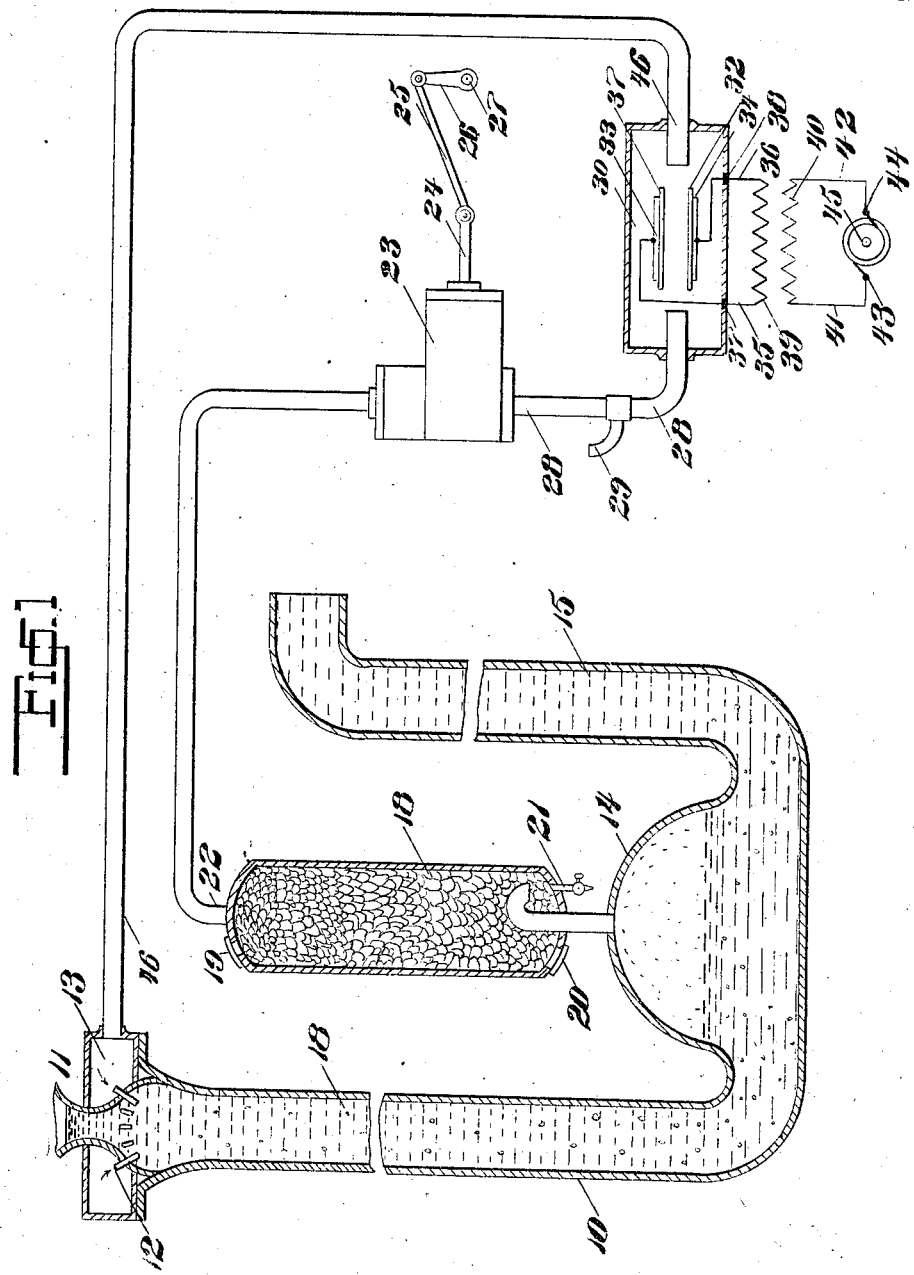

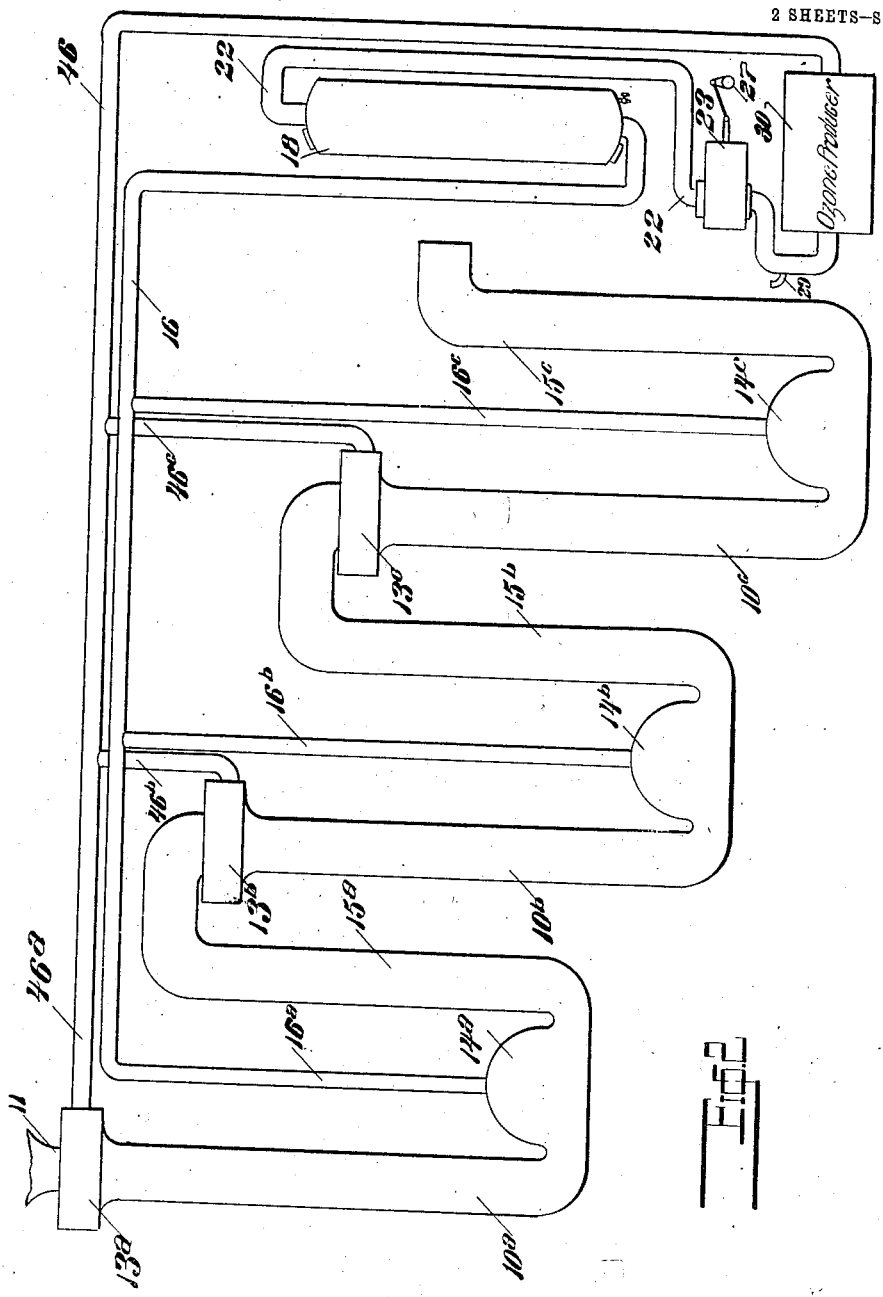

CHARLES S. BRADLEY, OF NEW YORK, N. Y., ASSIGNOR TO RICHARD B. WILSON, OF NEW YORK, N. Y.

OZONIZING AND COMPRESSING PROCESS.

996,561.        Specification of Letters Patent.      Patented June 27, 1911.

Original application filed June 19, 1905, Serial No. 265,920. Divided and this application filed December 4, 1905. Serial No. 290,182.

*To all whom it may concern:*

Be it known that I, CHARLES S. BRADLEY, a citizen of the United States, and a resident of the borough of Manhattan, city and county and State of New York, have invented new and useful Improvements in Ozonizing and Compressing Processes, of which the following is a specification.

My invention relates to a process for the sterilization of water by means of ozone, and is a division of an application entitled ozoning and compressing apparatus, filed by me June 19, 1905, Serial No. 265,920.

The object of my invention is to combine in a single system an efficient means for producing ozone, means for bringing the ozone produced into intimate contact with the water to be sterilized, and means for preparing the air for ozonization.

My improved process will best be understood from a description of an apparatus for carrying out the process, and I shall accordingly describe such an apparatus.

In my system I have combined a series of individual devices for performing the several features of the process each peculiarly adapted to its work in combination with the others so that the entire system or apparatus comprises a combination of elements, all coöperating to produce the desired result, and each one assisting the other in addition to doing its own work.

In order to avoid the necessity of purifying too large a quantity of air, I have arranged and operate my improved apparatus in such a manner that the same air, or at least the greater portion of the same air, is used over and over again, only so much new air being admitted into the system at each cycle as will supply the required amount of oxygen to make up for the ozone which has been removed during the cycle by the oxidation of the carbonaceous impurities in the water being treated.

In general, my system may be described as comprising a water tower in which ozonized air is isothermally compressed by and comes into intimate contact with the water being treated; a separating chamber in which the air and ozone, together with the carbon-dioxid and other obnoxious gases are allowed to rise from the water; a lime chamber or tower into which the gases rising from the separating chamber are discharged and through which they pass and wherein the carbon-dioxid is removed from the air; a compressed air engine suitably connected with the compressed air coming off of the lime tower and operated by the expansion of said air whereby the air is allowed to do work upon an operating shaft and is thus cooled and dried; and finally, the ozone producing apparatus into which the air thus cooled and dried is allowed to pass for the purpose of having its oxygen converted into ozone. In addition to these general features, my system comprises a suitable inlet for additional air which, as above mentioned, I supply to the apparatus at each cycle to compensate for the ozone taken up by the carbonaceous impurities of the water.

My invention is illustrated in the accompanying drawings, in which,

Figure 1 is a schematic representation of the entire system, and Fig. 2 is a similar view showing the form of apparatus used when it is necessary to supply a greater proportion of ozone to the water.

Referring to said drawings, 10 designates a water tower which has in its upper end a casting 11 through which the water to be treated enters and into which a plurality of air jet tubes 12 penetrate. These air jet tubes 12 receive the ozonized air from a surrounding receptacle 13, which is supplied with ozonized air in a manner hereinafter to be described. The column 10 may be about 30 feet in depth, though I do not wish to limit my apparatus to the use of a water column of any given length. Water passes down the tower 10 and arrives at the bottom in a separating chamber 14 which, as clearly shown, forms an enlargement of the water tower and has a dome-shaped roof. From here the water passes on upwardly through the discharge water tower 15 which may be of any suitable height, somewhat less than that of the water tower 10 and which discharges the water which has now been sterilized into suitable mains or reservoirs. The descent of the water into the column 10, through casting 11, past the inner ends of the air jet tubes 12, sucks in the ozonized air from the receptacle 13 in small bubbles so that the ozonized air is thoroughly mixed with the water and carried down through the column 10. Of course, the descent of the water through the column 10 must be sufficiently rapid to prevent the bubbles of the ozonized air from rising in the column and escaping. As the water containing the bubbles of ozonized air gradually drops in the column, the pressure on the gas correspondingly increases so that by the time the bubbles in the water have reached the bottom of the column, the pressure of the air has been raised perhaps three-quarters of an atmosphere. The heating of the gas due to the increase of pressure is almost entirely counter-balanced by the fact that the water being such a good absorbent, and having such a high specific heat, as compared with the air, and being in such intimate mixture with the air, immediately carries off from the air the heat of compression. In other words, the compression is isothermal. When the water and ozonized air reach the chamber 14 it is obvious that as the water is now traveling horizontally and has, for the time being, no vertical travel, the gas will rise from the water and collect under the dome-shaped roof of the separating chamber 14. This gas will probably consist mostly of air, together with a small quantity of remaining ozone, a slight amount of moisture and carbon-dioxid resulting from the oxidation of the carbonaceous impurities. Therefore to suitably remove the undesirable portions of the gas, I lead the composite gas, which is now under raised pressure, through the vertical tube 16 opening through the downwardly turned neck 17 into the lime tower 18. The lime tower 18 has at top and bottom respectively, manholes 19 and 20 for inserting and removing the lime with which the tower is filled and also has at the bottom a water draw-off faucet 21 to remove the water which collects in the bottom of this tower. The composite gas in passing through the lime chamber is deprived of its acid constituent, carbon-dioxid, and what little moisture is present, and the gas which now consists probably only of air, with a trace of remaining ozone, together with whatever moisture may be present in it, passes out at the top through the pipe 22. The air, which it should be remembered, is still under compression, is now delivered to the compressed air engine 23 which is suitably connected by piston rod 24, link 25 and crank 26 with the work shaft 27 which may be allowed to operate some part of the complete apparatus, such for instance, as the dynamo. The compressed air in doing work upon the shaft 27 loses its pressure and is cooled, also losing its moisture. Thus the air is cooled and dried and is then in excellent condition for having its oxygen converted to ozone.

It is well known that ozone cannot exist at high temperatures, and that the production of ozone generally speaking, varies as the temperature. It is therefore advisable to have the air before its entrance into the ozonizer cooled so that the resulting temperature will not be so high as to seriously affect the yield of ozone. It is furthermore well known that the air should be thoroughly dried before ozonizing as the presence of moisture lowers the yield of ozone.

The air in this condition leaves the compressed air engine 23 by the pipe 28 which has opening into it a suitable air inlet 29 for adding a small quantity of new air to the system, and passes on into the ozone producer 30. This ozone producer comprises in general two glass plates or disks 31 and 32 on the backs of which are placed sheets of tinfoil 33 and 34 which serve as electrodes and to which are attached wires 35 and 36 suitably insulated from the casing of the ozone producer at 37 and 38 and connected with the secondary 39 of the transformer. The primary coil 40 of the transformer is supplied with current through the wires 41 and 42, suitably connected to the brush pieces 43 and 44 of the alternator 45. The alternator 45 should be capable of giving a current of great frequency and high voltage. The specific construction of the ozone producing circuit, however, does not form a part of the present invention. It will be seen that the air which has been cooled and dried and renewed passes from the pipe 28 through the space between the glass plates 31 and 32 and finds its only escape by the tube 46 which extends around and opens into the receptacle 13, already described. As the water passes down through the casting 11, it creates a reduced pressure in the receptable 13, thereby causing a circulation of the air enriched with the ozone through the pipe 46 from the ozone producer 30.

In some instances, it will be found that the water requires a much greater amount of ozone to produce the desired sterilization and in these cases the apparatus will comprise the general system shown in Fig. 2.

As illustrated, the system here comprises a series of water towers $10^a$, $10^b$, $10^c$, similar to the above described water tower 10. Any suitable number may be used as the particular case demands. I have shown only three. These water towers are connected in series by the outlet towers $15^a$, $15^b$, and $15^c$, the water towers $10^a$, $10^b$, and $10^c$, being provided at their tops with ozonized air receptacles $13^a$, $13^b$ and $13^c$, into which lead the pipes $46^a$, $46^b$ and $46^c$, connected in parallel from the main ozonized air pipe 46. Each series has a corresponding separating chamber $14^a$, $14^b$ and $14^c$, from which lead the pipes $16^a$, $16^b$ and $16^c$ which discharge into the main take-off 16. The pipe 16 discharges the gas from all the towers into a common lime tower 18, the same as that shown in Fig. 1, and from this the take-off pipe 22 discharges the gas into the compressed air engine 23 as in the illustration shown in Fig. 1. From here the apparatus is the same as that shown in Fig. 1 and already described.

It will be seen from the above that each part of the system not only performs its own particular work, but also does something toward helping the other elements to do their work. For instance, the mixing tower 10 also assists the air cooling means, because it compresses the air and thus puts it in the condition in which the air-cooling means, i.e., the compressed air engine, can work its effect upon it.

Having thus described my invention, the following is what I claim as new therein and desire to secure by Letters Patent:

1. The herein described process of ozonizing, which consists in introducing ozone into a liquid to be sterilized, and permitting the ozone to remain in contact with the liquid under conditions which increase the pressure of the ozone.

2. The herein described process of ozonizing, which consists in ozonifying a gas, introducing the ozonified gas into the liquid to be sterilized, permitting the gas to remain in contact with the liquid under conditions which increase the pressure of the gas, separating the unabsorbed gas from the liquid, drying the separated gas, and reozonifying the gas.

3. The herein described process of ozonizing, which consists in ozonifying the gas, introducing the ozonified gas into the liquid which is to be sterilized, permitting the gas to remain in contact with the liquid under conditions which increase the pressure of the gas, separating the unabsorbed gas from the liquid, cooling the gas, and reozonifying the gas.

4. The herein described process of ozonizing, which consists in ozonifying the gas, introducing the gas into the liquid which is to be sterilized, permitting the gas to remain in contact with the liquid under conditions which compress the gas, separating the unabsorbed gas from the liquid, cooling and drying the gas and reozonifying the gas.

5. The herein described process of ozonizing, which consists in ozonifying the gas, drawing the ozonized gas into the liquid to be sterilized by the suction action of the liquid, permitting the gas to remain in contact with the liquid under conditions which increase the pressure of the gas, separating the unabsorbed gas from the liquid, drying the gas thus separated, and returning the gas to the ozonifier.

6. The herein described process of ozonizing, which consists in ozonifying the gas, drawing the ozonified gas into the liquid to be sterilized by the suction action of the liquid, permitting the ozonified gas to remain in contact with the liquid under conditions which increase the pressure of the gas, separating the unabsorbed gas from the liquid, cooling the gas thus separated and returning the gas to the ozonifier.

7. The herein described process of ozonizing, which consists in ozonifying the gas, drawing the ozonified gas into the liquid to be sterilized by the suction action of the liquid, permitting the ozonified gas to remain in contact with the liquid under conditions which increase the pressure of the gas, separating the unabsorbed gas from the liquid, cooling and drying the gas thus separated, and returning the gas to the ozonifier.

8. The herein described process of ozonizing, which consists in introducing ozone into the upper portion of a downwardly moving body of liquid to be sterilized, and permitting the ozone to be carried downwardly with the liquid and remain in contact therewith, whereby its pressure is increased.

9. The herein described process of ozonizing, which consists in ozonifying the gas, introducing the ozonified gas into the upper portion of a downwardly moving body of liquid to be sterilized, permitting the gas to remain in contact with and be carried downwardly by the liquid, whereby the pressure of the gas is increased, separating the unabsorbed gas from the liquid, drying the separated gas, and reozonifying the gas.

10. The herein described process of ozonizing, which consists in ozonifying a gas, introducing the ozonified gas into the upper portion of the downwardly moving body of liquid to be sterilized, permitting the gas to remain in contact with and be carried downwardly by the body of liquid, whereby the pressure of the gas is increased, separating the unabsorbed gas from the liquid, cooling the gas and reozonifying the gas.

11. The herein described process of ozonizing, which consists in ozonifying a gas, introducing the gas into the upper portion of a downwardly moving body of liquid to be sterilized, permitting the gas to remain in contact with and be carried downwardly by the liquid, whereby the gas is compressed, separating the unabsorbed gas from the liquid, cooling and drying the gas and reozonifying the gas.

12. The herein described process of ozonizing, which consists in ozonifying the gas, drawing the ozonified gas into the upper portion of a downwardly moving body of liquid to be sterilized, by the suction action of the liquid, permitting the gas to remain in contact with and be carried downwardly by the liquid, whereby the gas is compressed, separating the unabsorbed gas from the liquid, drying the gas thus separated, and returning the gas to the ozonifier.

13. The herein described process of ozonizing, which consists in ozonifying the gas, drawing the ozonified gas into the upper portion of a downwardly moving body of liquid to be sterilized, by the suction action of the liquid, permitting the ozonified gas to remain in contact with and be carried downwardly by the body of liquid, whereby the gas is compressed, separating the unabsorbed gas from the liquid, cooling the gas thus separated and returning the gas to the ozonifier.

14. The herein described process of ozonizing, which consists in ozonifying the gas, drawing the ozonified gas into the upper portion of a downwardly moving body of liquid to be sterilized by the suction action of the liquid, permitting the ozonified gas to remain in contact with and be carried downwardly by the liquid, whereby the gas is compressed, separating the unabsorbed gas from the liquid, cooling and drying the gas thus separated, and returning the gas to the ozonifier.

15. The herein described process of ozonizing, which consists in ozonifying the gas, introducing the ozonified gas into the upper portion of a downwardly moving body of liquid, permitting the gas to remain in contact with and be carried downwardly by the liquid, whereby the gas is isothermally compressed, separating the gas under compression from the liquid, adiabatically expanding the gas and returning the gas thus expanded to the ozonifier.

16. The herein described process of ozonizing, which consists in ozonifying a gas, introducing the gas into the upper portion of a downwardly moving body of liquid to be sterilized by the suction action of the liquid, permitting the gas to remain in contact with and be carried downwardly by the liquid, whereby the gas is isothermally compressed, separating the gas under compression from the liquid, removing carbon dioxid from the separated gas, adiabatically expanding the gas and reozonizing the gas.

17. The herein described process of ozonizing, which consists in ozonifying the gas, introducing the ozonified gas into the upper portion of a downwardly moving body of liquid to be sterilized by the suction action of the liquid, permitting the gas to remain in contact with and be carried downwardly by the body of liquid, whereby the gas is isothermally compressed, separating the gas under compression from the liquid, removing the carbon dioxid from the gas, adiabatically expanding the gas, adding a relatively small quantity of fresh gas to the old gas, and reozonifying the gas.

18. The process of sterilizing liquids, which consists in mingling a sterilizing gas with the liquid to be sterilized under a gradually increasing pressure, separating the gas from the liquid, expanding the gas to cool it to assist in its regeneration, and regenerating the sterilizing gas.

19. The process of sterilizing liquids, which consists in ozonizing a gas, mixing the gas with the liquid in such manner as to sterilize the liquid and compress the gas, expanding the gas, and then reozonizing it.

20. The process of sterilizing liquids, which consists in ozonizing a gas, mixing the gas with the liquid in such manner as to sterilize the liquid and compress the gas, separating the compressed gas from the sterilized liquid, purifying the compressed gas, expanding the compressed gas to cool it, and reozonizing the cooled gas.

21. The process of sterilizing liquids, which consists in ozonizing a gas, mixing the gas with the liquid in such manner as to sterilize the liquid and isothermally compress the gas, separating the gas from the liquid, expanding the gas to cool it, and reozonizing the gas.

22. The process of sterilizing liquids, which consists in ozonizing a gas, intermingling the gas with the liquid to be sterilized under gradual isothermal compression, removing the gas, expanding it to assist in its reozonization, and reozonizing the gas.

23. The process of sterilizing liquids, which consists in ozonizing a gas, intermingling the gas with the liquid to be sterilized under gradual isothermal compression, separating the gas from the liquid, expanding it to assist in its reozonization, adding a small amount of new gas thereto, and reozonizing the gas.

24. The herein described process for sterilizing, which consists in employing ozonized gas for the sterilizing under conditions which compress the gas, expanding the gas thus compressed, reozonizing the gas thus expanded, and again employing the gas for the sterilizing.

25. The herein described process for sterilizing, which consists in employing ozonized gas for sterilizing under conditions which compress the gas, expanding the gas thus compressed, reozonizing the gas thus expanded together with an additional supply of fresh gas, and again employing the reozonized gas, together with the ozonized fresh gas for the sterilizing.

26. The herein described process for sterilizing, which consists in employing ozonized gas for the sterilizing under conditions which compress the gas isothermally, expanding adiabatically the gas thus isothermally compressed, reozonizing the gas thus expanded and again employing the reozonized gas for the sterilizing.

27. The herein described process for sterilizing, which consists in employing ozonized gas for the sterilizing under conditions which isothermally compress the gas, expanding adiabatically the gas thus isothermally compressed, reozonizing the gas thus expanded together with a new supply of fresh gas, and again employing the reozonized gas together with the ozonized fresh gas for the sterilizing.

CHARLES S. BRADLEY.

Witnesses:
WM. E. KNIGHT,
O. KNIGHT.